United States Patent [19]

Haroutel et al.

[11] Patent Number: 4,805,950
[45] Date of Patent: Feb. 21, 1989

[54] IMPELLER DRIVEN SUCTION DEVICE FOR ROTATABLY HOLDING FLAT OBJECTS

[75] Inventors: Jean-Claude Haroutel, Orsay; Philippe Michel, Asnieres, both of France

[73] Assignee: SMH Alcatel, Paris, France

[21] Appl. No.: 133,392

[22] Filed: Dec. 15, 1987

[30] Foreign Application Priority Data

Dec. 17, 1986 [FR] France .................. 86 17688

[51] Int. Cl.$^4$ .................. B25J 15/06; B66C 1/02
[52] U.S. Cl. .................. 294/64.1; 415/121 R; 417/423.1; 414/737; 414/752; 414/744.2
[58] Field of Search .................. 414/737, 744 B, 752; 415/121 R, 127; 417/423 R, 423 L, 423 T; 269/21; 294/64.1; 901/40

[56] References Cited

U.S. PATENT DOCUMENTS

| 1,453,055 | 4/1923 | Phelps | 415/127 |
| 3,313,568 | 4/1967 | Fogg | 294/64.1 |
| 3,366,410 | 1/1968 | Fogg | 294/64.1 |
| 3,853,345 | 12/1974 | Miller | 294/64 R |
| 4,553,892 | 11/1985 | Huffman et al. | 414/121 |

FOREIGN PATENT DOCUMENTS

| 1103355 | 3/1961 | Fed. Rep. of Germany . |
| 2526766 | 11/1983 | France . |
| 2026432 | 2/1980 | United Kingdom . |

Primary Examiner—Robert B. Reeves
Assistant Examiner—Gary C. Hoge
Attorney, Agent, or Firm—Sughrue, Mion, Zinn, Macpeak, and Seas

[57] ABSTRACT

A device for holding flat objects comprises a motor on the output shaft of which is mounted a rotatable terminator assembly. A turbine is rotatable by the motor within the terminator assembly, which is partly partitioned forwardly of the turbine. The terminator assembly comprises a flat suction chamber open laterally and containing the turbine and a flat holding chamber forward of and communicating with the suction chamber. This has an open holding surface facing forwardly which is closed off by an object to be held. A separate motor-gearbox unit coupled to the terminator assembly controls its orientation relative to the turbine drive motor.

8 Claims, 3 Drawing Sheets

IMPELLER DRIVEN SUCTION DEVICE FOR ROTATABLY HOLDING FLAT OBJECTS

REFERENCE TO RELATED APPLICATION

This application relates to application Ser. No. 133,459, filed Dec. 15, 1987, entitled "Dispenser for Flat Products".

BACKGROUND OF THE INVENTION

1. Field of the Invention

The present invention concerns devices for holding flat products, in particular flat products or objects that can have a relatively large surface area.

2. Description of the Prior Art

Devices for holding flat products usually employ suckers mounted at the bent over end of a tubular support and connected to a vacuum pump. The device applied to the product to be held functions by creating a large drop in pressure over a small area of the surface of the product which closes off the sucker, so as to hold it against the device and transfer it elsewhere. This is not satisfactory where the product has a relatively large surface area and weight.

Under these conditions the device has to be centered as accurately as possible on the product and the pressure has to be greatly reduced. Operation is even less satisfactory where the surface of the product to be held is irregular and/or porous. Nor does the device provide any simple way of reorienting the product during its transfer, although such reorientation is sometimes necessary to facilitate the transfer of bulky products.

Also, such devices are extremely noisy in operation and are costly to implement.

An object of the present invention is to provide a device for holding flat products having a compact structure and avoiding the aforementioned disadvantages.

SUMMARY OF THE INVENTION

The invention consists of a device for holding flat products, comprising a motor having an output shaft, a terminator assembly mounted on and freely rotatable on said shaft and a turbine rotatable within said terminator assembly, wherein said terminator assembly is partly partitioned forwardly of said turbine and comprises a flat suction chamber open laterally and adapted to contain said turbine and a flat holding chamber forward of and communicating with said suction chamber having an open holding surface facing forwardly and adapted to be closed off by a product to be held.

In a preferred embodiment the device further comprises a centered toothed wheel freely rotatable on said shaft and to which said terminator assembly is fixed and a motor-gearbox unit controlling the orientation of said terminator assembly relative to said shaft and to which said toothed wheel is coupled.

The characteristics and advantages of the present invention will emerge from the following description of one embodiment thereof given by way of example only and with reference to the appended diagrammatic drawings.

DESCRIPTION OF THE PREFERRED EMBODIMENT

Figure 1:
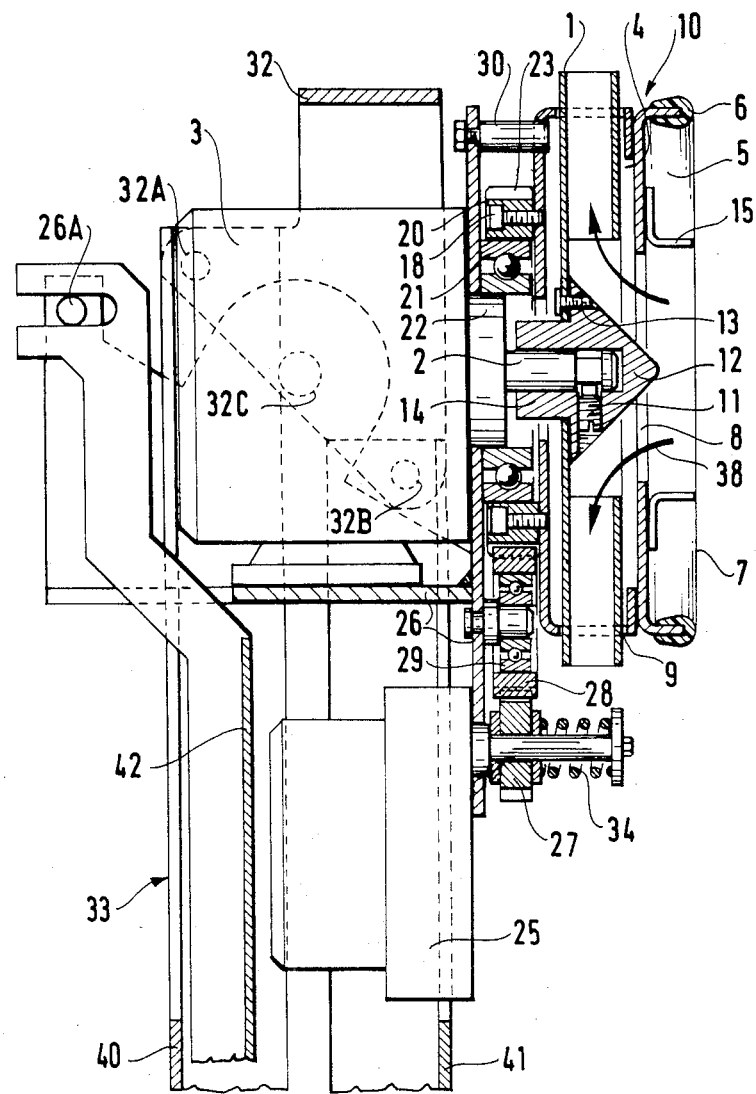
FIG. 1 is a view in cross-section of a device in accordance with the invention for holding flat products.
Figure 2:
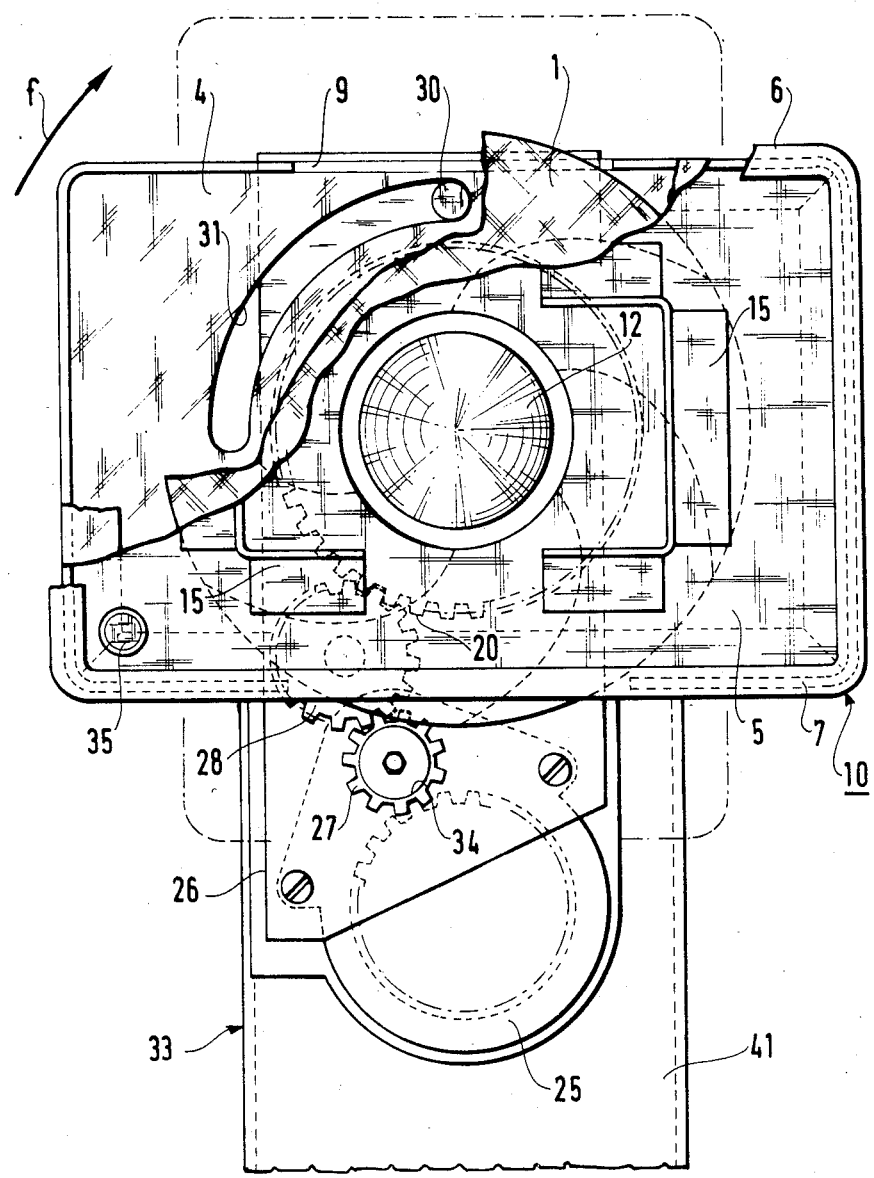
FIG. 2 is a front view of the same holding device.

The holding device comprises a turbine 1 fixed to the end of the shaft 2 of a drive or turbine motor 3. The turbine 1 is mounted in a first flat chamber 4 which communicates with a second flat chamber 5 referred to as the front chamber. The motor 3 and the front chamber 5 are on opposite sides of the chamber 4.

The two flat chambers 4 and 5 are of rectangular cross-section and have the same peripheral contour. The front chamber 5 has an open surface at the front with a sealing bead 6 around its peripheral edge and constitutes a holding surface 7. The opening 8 providing communication between the two chambers is on the axis of the turbine and on the axis of the motor. Lateral openings 9 are provided in the chamber 4, substantially in the central part of its larger dimension side walls, the turbine projecting slightly through these openings 9.

The two chambers 4 and 5 are in back-to-back relation to each other and fixed to each other, by spot welding, for example. They form on the shaft of the motor 3 a terminator assembly generally designated 10, carried by the motor but free to rotate relative to its shaft 2, and within which the turbine rotates with the shaft 2. This terminator assembly containing the turbine is partially partitioned forwardly of the turbine and open at the front and laterally to the turbine.

The turbine 1 is fixed to the end of the shaft 2 by a screw 11. A conical cap 12 mounted in the central part of the turbine and fixed to the turbine by screws 13, for example, covers the screwhead and forms an inlet cone where air enters the turbine. This cap also defines on the turbine, externally of the side facing the motor 3, a sleeve 14 for centering the turbine on the shaft 2.

Two U-shaped members 15 are mounted facing each other in the front chamber 5. They constitute two end stops for the packets taken up by the holding device. They are spot welded to the back of the front chamber 5 and ensure that packets are held flat against the terminator assembly of the holding device.

The terminator assembly 10 is fixed by screws 18 to a ring 20 mounted on a ball bearing 21 itself mounted on the bearing 22 of the motor 3. The ring 20 and the terminator assembly 10 are thus free to rotate relative to the shaft 2.

The ring 20 has teeth 23 around its perimeter and is coupled to a control motor-gearbox unit 25. This motor-gearbox unit 25 and the motor 3 are supported on a motor support member 26. A control gearwheel 27 on the shaft of the motor-gearbox unit and an intermediate ring 28 mounted on another ball bearing 29 carried by the member 26 couple the motor-gearbox unit and the ring 20 for rotation of the terminator assembly 10 about the axis of the turbine 1 independently of the rotation of the latter by the turbine motor 3.

A peg 30 and an arcuate slot 31, one fixed and independent of the terminator assembly and the other moving with the terminator assembly, guide rotation of the terminator assembly 10 and limit this rotation to 90°. In the embodiment shown the slot 31 is formed on the outside of the back of the chamber 4 and the peg is carried by a branch of the motor support member 26. In connection with such limitation of rotation of the terminator assembly to 90°, a torque limiter 34 is associated with the control gearwheel 27 on the shaft of the motor-gearbox unit 25.

The holding device, in which the turbine 1 rotates in the terminator assembly 10 which can itself rotate through 90° to obtain a preferred orientation of its holding surface, is mounted via a connecting member 32 on the end of a support 33 which displaces the device. The connecting member 32 is stirrup-shaped. The support 33 forms a parallelogram type support on the holding device.

Figure 3:
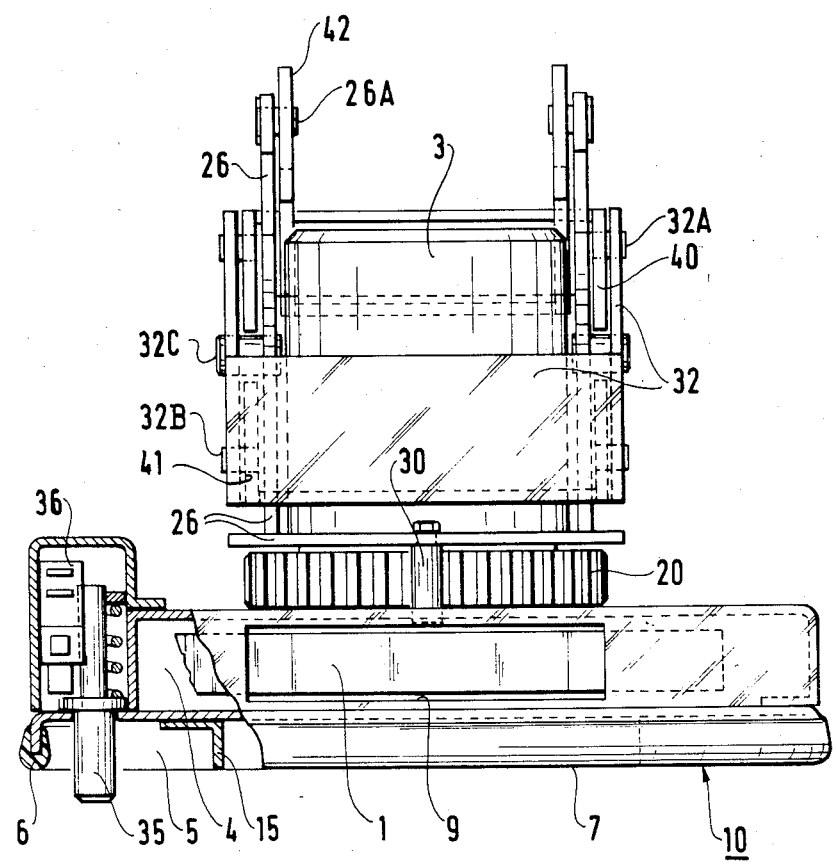
FIG. 3 is a partial and partially cut away plan view of the holding device.

The holding device is further provided, as shown in FIG. 3 in particular, with a circuit for sensing application of the device against the packet to be held. It comprises a feeler in the form of a retractable finger 35 mounted at one side of the terminator assembly 10 and, in its non-retracted position, projecting through the holding surface 7, together with an associated switch 36 mounted in corresponding relationship to the finger on the terminator assembly This switch is operated by the finger 35 when the latter retracts as a result of firm application of the holding device 32 onto the packet to be held, whereupon it commands the turbine motor 3.

To mount the holding device onto the motor 3, two pivots 32A and 32B articulate the connecting member 32 to the U-shaped cross-section longitudinal arms 40 and 41 of the support 33 and a pivot 32C articulates the connecting part 32 to flanges forming part of the motor support member 26 and designated by the same reference numeral 26. The support 33 further comprises, associated with its arms 40 and 41, a control lever 42 articulated to the motor support member 26 by a pivot 26A. The arms and the lever of the support are also articulated at the end opposite the device (these arrangements are not shown in the figures) and is caused to pivot about these pivots at the opposite end to the holding device and to move in translation by appropriate control means connected to the lever 42 and to the arms.

In use, as soon as the terminator assembly is closed off by the product to be held the turbine is started; the suction chamber 4 depressurizes the front chamber 5 by causing air to circulate from the chamber 5 towards the apertures 9, as represented by the arrows 38 in FIG. 1, to hold the product onto the holding device.

The product held in this way can then be transferred elsewhere, and reoriented on the holding device by rotating the latter 90° about the turbine axis.

The chamber 5 defines a large area on the product for holding it, the profiled members 15 in the chamber 5 holding it flat against the terminator assembly 10.

There is claimed:

1. Device for holding flat products, comprising a motor having an output shaft, a terminator assembly mounted on and rotatable on said shaft and a turbine rotatable within said terminator assembly, wherein said terminator assembly is partly partitioned forwardly of said turbine and comprises a flat suction chamber open laterally and adapted to contain said turbine and a flat holding chamber forward of and communicating with said suction chamber having an open holding surface facing forwardly and adapted to be closed off by a product to be held.

2. Device according to claim 1, wherein said holding chamber comprises a sealing bead at the peripheral edge of said holding surface.

3. Device according to claim 2, comprising a feeler on said holding surface and a switch controlling said motor and adapted to be operated by said feeler when said holding surface is closed off by an object to be held.

4. Device according to claim 3, wherein said feeler comprises a retractable finger which, when unoperated, projects through said holding surface.

5. Device according to claim 1, further comprising a centered toothed wheel freely rotatable on said shaft and to which said terminator assembly is fixed and a motor-gearbox unit controlling the orientation of said terminator assembly relative to said shaft and to which said toothed wheel is coupled.

6. Device according to claim 5, further comprising means for guiding said terminator assembly during alteration of its orientation relative to said shaft.

7. Device according to claim 6, further comprising travel limiting means for said motor-gearbox unit.

8. Device according to claim 7, wherein said guide means and said travel limiting means are constituted by a peg and a slot in which said peg is inserted, one of said peg or said slot being on said terminator assembly and mobile herewith and the other of said peg or said slot being fixed relative to said device.

* * * * *